United States Patent
Wu et al.

(10) Patent No.: US 8,986,819 B2
(45) Date of Patent: *Mar. 24, 2015

(54) PALLADIUM PRECURSOR COMPOSITION

(71) Applicant: Xerox Corporation, Norwalk, CT (US)

(72) Inventors: Yiliang Wu, Oakville (CA); Ping Liu, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,154

(22) Filed: Oct. 16, 2013

(65) Prior Publication Data
US 2014/0087141 A1  Mar. 27, 2014

Related U.S. Application Data

(63) Continuation-in-part of application No. 13/290,825, filed on Nov. 7, 2011, now Pat. No. 8,568,824, which is a continuation-in-part of application No. 13/153,856, filed on Jun. 6, 2011, now Pat. No. 8,574,665.

(51) Int. Cl.
| | |
|---|---|
| H05K 1/09 | (2006.01) |
| H05K 1/00 | (2006.01) |
| H05K 3/12 | (2006.01) |
| H05K 3/18 | (2006.01) |
| C23C 18/02 | (2006.01) |
| C23C 18/00 | (2006.01) |
| C23C 18/08 | (2006.01) |
| H01B 1/02 | (2006.01) |
| C09D 11/52 | (2014.01) |

(52) U.S. Cl.
CPC ........ *H01B 1/02* (2013.01); *C09D 11/52* (2013.01); *C23C 18/08* (2013.01)
USPC .......... 428/206; 428/98; 428/195.1; 428/209; 252/518.1; 252/519.2; 252/519.21; 252/519.3; 252/519.33; 252/520.3; 252/521.6; 427/96.1; 427/123; 427/125; 427/126.1; 427/97.1; 427/97.3; 427/97.4; 427/97.6

(58) Field of Classification Search
None
See application file for complete search history.

(56) References Cited

U.S. PATENT DOCUMENTS

| | | | |
|---|---|---|---|
| 3,418,143 A | 12/1968 | Sergienko | |
| 4,341,846 A | 7/1982 | Hough et al. | |
| 4,841,119 A * | 6/1989 | Chambaere | 219/146.1 |
| 5,882,736 A | 3/1999 | Stein et al. | |
| 5,894,038 A | 4/1999 | Sharma et al. | |
| 6,429,580 B1 | 8/2002 | Kobayashi et al. | |

(Continued)

FOREIGN PATENT DOCUMENTS

| | | |
|---|---|---|
| EP | 0989205 | 3/2000 |
| JP | 10072673 | 3/1998 |

OTHER PUBLICATIONS

European Search Report mailed Oct. 22, 2012 for European Application No. 12170434.0.

*Primary Examiner* — Michael Cleveland
*Assistant Examiner* — Lisha Jiang
(74) *Attorney, Agent, or Firm* — Fay Sharpe LLP

(57) ABSTRACT

A non-catalytic palladium precursor composition is disclosed, including a palladium salt and an organoamine, wherein the composition is substantially free of water. The composition permits the use of solution processing methods to form a palladium layer on a wide variety of substrates, including in a pattern to form circuitry or pathways for electronic devices.

12 Claims, 7 Drawing Sheets

(56) References Cited

U.S. PATENT DOCUMENTS

| | | |
|---|---|---|
| 7,537,799 B2 | 5/2009 | Etheridge |
| 2003/0119288 A1* | 6/2003 | Yamazaki et al. ............ 438/565 |
| 2003/0148024 A1 | 8/2003 | Kodas et al. |
| 2004/0014266 A1* | 1/2004 | Uno et al. .................... 438/200 |
| 2005/0005820 A1 | 1/2005 | Etheridge |
| 2005/0151253 A1* | 7/2005 | Nonaka et al. ................ 257/741 |
| 2008/0083299 A1 | 4/2008 | Simone et al. |
| 2008/0265414 A1* | 10/2008 | Ho et al. ....................... 257/741 |
| 2009/0274834 A1 | 11/2009 | Chopra et al. |
| 2009/0297802 A1 | 12/2009 | Sastry et al. |
| 2010/0233361 A1 | 9/2010 | Hu et al. |
| 2011/0059233 A1 | 3/2011 | Liu et al. |
| 2012/0308719 A1 | 12/2012 | Wu et al. |

* cited by examiner ial composition Ser. No. 13/290,825, filed Nov. 7, 2011, now U.S. Pat. No. 8,568,824, which was a continuation-in-part from U.S. patent application Ser. No. 13/153,856, filed on Jun. 6, 2011, now U.S. Pat. No. 8,574,665. The entirety of each application is hereby fully incorporated by reference herein.

BACKGROUND

This application is a continuation-in-part from U.S. patent application Ser. No. 13/290,825, filed Nov. 7, 2011, which was a continuation-in-part from U.S. patent application Ser. No. 13/153,856, filed on Jun. 6, 2011. The entirety of each application is hereby fully incorporated by reference herein.

The present disclosure relates to compositions and processes for depositing and forming palladium layers on various substrates. The compositions may be solutions, for example, and used to coat, print, etc. objects such as electronic devices or components thereof by solution deposition processes including spin coating, dip coating, and inkjet printing.

Palladium (Pd) is a rare metal with many unique properties, resulting in its widespread use. For example, palladium is used in catalytic converters of automobiles to convert combustion byproducts into less harmful substances. Palladium is also used in many electronics devices, ceramic capacitors, fuel cells, and so on. Palladium structures are conventionally formed in such devices by electroplating, sputtering, or chemical vapor deposition (CVD).

It would be desirable to use lower-cost approaches to form palladium structures. There is a need for solution-processable compositions that can be used for palladium deposition.

BRIEF DESCRIPTION

Disclosed in various embodiments are solution processable palladium precursor compositions that can be used to form palladium layers and/or structures on a variety of substrates. These compositions are useful for coating and printing substrates, such as in a pattern with a palladium layer, and can be used for fabricating electronically conductive elements, pathways, and/or circuits of electronic devices. The resulting palladium layers and/or structures are substantially uniform and exhibit high conductivity and good adhesion at low temperatures.

In one embodiment, a non-catalytic palladium precursor composition is disclosed that comprises starting ingredients including a palladium salt and an organoamine. The palladium precursor composition may also consist essentially of the palladium salt and the organoamine. More particularly, the palladium precursor composition is substantially free of water. In embodiments, a non-catalytic palladium precursor composition, comprising starting ingredients including a palladium salt and an organoamine, wherein the composition is substantially free of a reducing agent and the composition does not contact another composition including a reducing agent.

The palladium salt may be selected from the group consisting of palladium carboxylate, palladium chloride, palladium nitrate, palladium sulfate, palladium iodide, palladium cyanide, ethylenediamine palladium chloride, tetraaminepalladium bromide, bis(acetylacetonato) palladium, diamine dinitro palladium, and mixtures thereof. In particularly desirable embodiments, the palladium salt is palladium carboxylate, $Pd(OOCR^1)_x(OOCR^2)_{2-x}$.

In some embodiments, the organoamine may have a melting point below 50° C.

In specific embodiments, the organoamine is ethylamine, propylamine, butylamine, pentylamine, hexylamine, heptylamine, octylamine, nonylamine, decylamine, undecylamine, dodecylamine, tridecylamine, tetradecylamine, hexadecylamine, diaminobutane, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, triethylamine, tributylamine, or trihexylamine. In other particular embodiments, the organoamine is immiscible in water. Water immiscible organoamines include octylamine, nonylamine, decylamine, undecylamine, dodecylamine, tridecylamine, tetradecylamine, hexadecylamine, dipentylamine, dihexylamine, diheptylamine, dioctylamine, dinonylamine, didecylamine, propylpentylamine, butylpentylamine, tributylamine, or trihexylamine. In still other embodiments, the organoamine is a monoamine, or in other words contains only one nitrogen atom.

The palladium salt may be from about 1 to about 50 weight percent of the precursor composition. The molar ratio of the organoamine to the palladium salt may be from about 1:1 to about 10:1.

The palladium precursor composition has a surface tension less than 33 mN/m at 25° C.

In some specific embodiments, the total number of carbon atoms in the palladium salt and the organoamine is 10 or higher. The method of determining the total number is described further herein.

If desired, a second water immiscible organic solvent may be included in the composition. The second water immiscible organic solvent may be selected from the group consisting of toluene, xylene, mesitylene, ethylbenzene, diethylbenzene, trimethyl benzene, methyl ethylbenzene, tetrahydronaphthalene, methy isobutyl ketone, methyl benzoate, benzyl benzoate, anisole, cyclohexanone, or acetophenone, or mixtures thereof.

The palladium salt and the organoamine may form a palladium organoamine complex. In embodiments, at least a portion of the palladium salt and the organoamine form a palladium organoamine complex. The composition may also contain non-complexed organoamine and/or non-complexed palladium salt.

In some embodiments, the palladium precursor composition fails to comprise a reducing agent. Stated another way, the composition does not contain any reducing agent, or is substantially free of reducing agent.

If desired, the starting ingredients may further comprise another metal species selected from silver (Ag), gold (Au), copper (Cu), nickel (Ni), rhodium (Rh), cobalt (Co), zinc (Zn), and platinum (Pt). The metal species may be introduced, for example, in the form of a salt.

Also disclosed in embodiments is a process for forming a conductive palladium layer on a substrate. A palladium precursor composition that comprises a palladium salt and an organoamine, and is substantially free of reducing agent is produced or received. The palladium precursor composition is solution deposited upon the substrate, such as in a predetermined pattern. The palladium precursor composition is then heated to form the palladium layer. Also disclosed is the product produced by this process.

The solution depositing can be performed by spin coating, dip coating, spray coating, flexographic printing, offset printing, or inkjet printing the palladium precursor composition onto the substrate. In some embodiments, the precursor composition is amorphous after solution depositing.

In certain embodiments, no reducing agent is added during the process. In other embodiments, the precursor composition is substantially free of water.

The heating may be performed at a temperature of from about 80° C. to about 350° C. for a period of from about 0.1 second to about 30 minutes. Sometimes, the precursor composition is solution deposited multiple times before the heating.

Sometimes, palladium nanoparticles are formed as an intermediate during the heating. These nanoparticles then form the conductive palladium layer.

Additionally disclosed in embodiments is a process for forming an electrically conductive palladium layer on an object, such as an electrically conductive pathway or circuit on a substrate. A palladium precursor solution that consists essentially of at least one palladium salt, at least one organoamine, and an optional second organic solvent, and is substantially free of water and/or a reducing agent is received or produced. The palladium salt and the organoamine may form a complex. The palladium precursor composition is solution deposited upon the substrate, for example in a predetermined pattern, to form an amorphous structure on the object. The structure can be in the form of a pathway or a circuit. The amorphous structure is then heated to form the palladium layer. Also disclosed are the electrically conductive components and/or devices produced by this process.

Further described in embodiments herein is a palladium organoamine complex formed from a palladium salt and at least one organoamine. In specific embodiments, the organoamines are monoamines, particularly primary monoamines as discussed further herein. In specific embodiments, the palladium organoamine complex is an amorphous material.

Also described in embodiments herein is a non-catalytic palladium precursor composition comprising a palladium organoamine complex, wherein the composition is substantially free of water. The palladium organoamine complex may be formed from a palladium carboxylate and at least one organoamine.

Also described in embodiments is a non-catalytic palladium precursor composition, comprising starting ingredients including a palladium salt and an organoamine, wherein the organoamine functions as a solvent.

These and other non-limiting characteristics of the disclosure are more particularly disclosed below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

DETAILED DESCRIPTION

Figure 1:
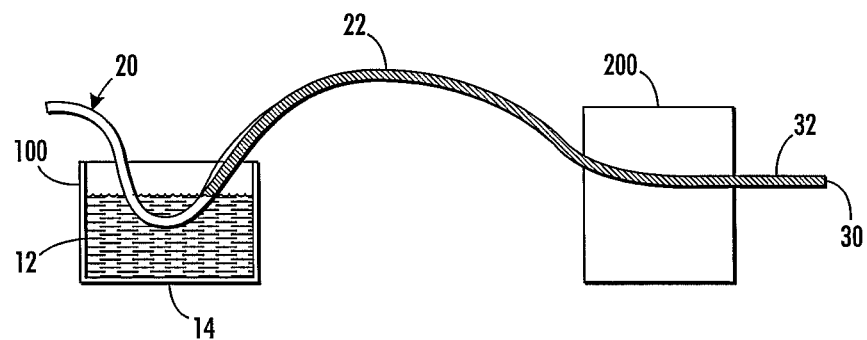
FIG. 1 is a schematic diagram showing the process of coating a substrate (e.g. a wire) of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The term "room temperature" refers to a temperature of about 23° C.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The use of the singular terms "a", "an", and "the" should be construed to include plural referents as well, unless clearly indicated otherwise by the context. Put another way, these singular terms should be construed as "at least one".

The present disclosure relates to palladium precursor compositions which can be used with liquid-based deposition processes to make a palladium layer on an object or a substrate. The palladium precursor compositions of the present invention comprise a palladium salt and an organoamine, and are substantially free of water. In other embodiments, the palladium precursor compositions of the present disclosure are substantially free of water and substantially free of reducing agent. In some embodiments, the organoamine functions as both a complexing agent and a solvent. In other embodiments, the organoamine functions as a complexing agent only, and the palladium precursor composition can further comprise a second organic solvent. In specific embodiments, the organoamine functions as a complexing agent only, and the palladium precursor composition can further comprise a second organic solvent which is immiscible with water. In other specific embodiments, the organoamine functions as both a complexing agent and a solvent, and the palladium precursor composition can further comprise a second organic solvent. These precursor compositions can be processed into palladium layers with high conductivity and good adhesion at low temperatures. In particular embodiments, the palladium precursor compositions consist essentially of the palladium salt and at least one organoamine. In other particular embodiments, the palladium precursor compositions consist essentially of the palladium salt, at least one organoamine, and a water immiscible organic solvent.

The palladium salt may be selected from the group consisting of palladium carboxylate, palladium chloride, palladium nitrate, palladium sulfate, palladium iodide, palladium cyanide, ethylenediamine palladium chloride, tetraaminepalladium bromide, bis(acetylacetonato) palladium, diamine dinitro palladium, or mixtures thereof.

In some embodiments, the palladium salt is a palladium carboxylate having a general structure of $Pd(OOCR^1)_x(OOCR^2)_{2-x}$, wherein $R^1$ and $R^2$ are independently selected from hydrogen, alkyl having 1 to 11 carbon atoms, alkenyl having 2 to about 13 carbon atoms, and alkynyl having 2 to about 13 carbon atoms. Hydrogen atoms on $R^1$ or $R^2$ may be substituted with another functional group such as —CHO, —OH, halogen, and the like. In specific embodiments, the palladium carboxylate is palladium acetate, $Pd(O-CO-CH_3)_2$. The number x can be any number from 0 to 2, for example, 0, 0.01, 0.1, 1, 1.5, 1.57, 2.0, and the like. In preferred embodiments, the palladium salt is a palladium carboxylate.

The term "alkyl" refers to a radical composed entirely of carbon atoms and hydrogen atoms which is fully saturated and of the formula $-C_nH_{2n+1}$. The alkyl radical may be linear, branched, or cyclic.

The term "alkenyl" refers to a radical composed entirely of carbon atoms and hydrogen atoms which contains at least one carbon-carbon double bond. An alkenyl radical may be linear or branched. Aromatic rings are not considered to be alkenyl.

The term "alkynyl" refers to a radical composed entirely of carbon atoms and hydrogen atoms which contains at least one carbon-carbon triple bond.

It should be noted that the palladium salt is a molecular compound. Pd—Pd bonds may be present in the molecular compound. However, the palladium salt should not be considered to be a nanoparticle or similar material. The palladium atom in the salt is not zero valent, while palladium atoms are zero valent in the nanoparticle form.

The organoamine may function as a complexing agent. Generally, the organoamine may be any primary, secondary, or tertiary amine. The organoamine can also be a monoamine, diamine, or polyamine. Combinations of more than one organoamine are also contemplated. More specifically, the organoamine may contain one, two, or more amine groups of Formula (I):

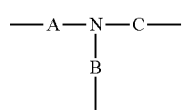

Formula (I)

wherein A, B, and C are independently selected from hydrogen and an organic group, and at least one is an organic group. When the tertiary amine contains more than one such amine group, the nitrogen atoms are not directly bonded to each other. An organic group contains at least one carbon atom. Exemplary organic groups include alkyl, aryl, substituted alkyl, and substituted aryl. Any two of organic groups A, B and C can form a cyclic structure.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms).

The term "substituted" refers to at least one hydrogen atom on the named radical being substituted with another functional group, such as halogen, hydroxyl, mercapto (—SH), —CN, —$NO_2$, —COOH, and —$SO_3H$. An exemplary substituted alkyl group is a perhaloalkyl group, wherein one or more hydrogen atoms in an alkyl group are replaced with halogen atoms, such as fluorine, chlorine, iodine, and bromine. Besides the aforementioned functional groups, an aryl or heteroaryl group may also be substituted with alkyl or alkoxy. Exemplary substituted aryl groups include methylphenyl and methoxyphenyl.

Some specific examples of organoamines include ethylamine, propylamine, butylamine, pentylamine, hexylamine, heptylamine, octylamine, nonylamine, decylamine, undecylamine, dodecylamine, tridecylamine, tetradecylamine, hexadecylamine, diaminobutane, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, triethylamine, tributylamine, and trihexylamine.

In more specific embodiments, the organoamine(s) present in the palladium precursor composition is immiscible in water. Generally, water immiscible organoamines contain at least 8 carbon atoms per amine group. In particular embodiments, the organoamine has only one nitrogen atom (i.e. a monoamine). Exemplary water immiscible organoamines include primary aliphatic amines of the formula $NH_2-R^3$, where $R^3$ is alkyl having from 8 to about 18 carbon atoms, especially those where the $R^3$ is a linear alkyl chain. Some secondary aliphatic amines are also water immiscible, such as those of the formula $NHR^4R^5$, where $R^4$ and $R^5$ are independently alkyl having from 4 to about 18 carbon atoms. Some tertiary aliphatic amines are also water immiscible, such as those of the formula $NR^6R^7R^8$, where $R^6$, $R^7$, and $R^8$ are independently alkyl having from 3 to about 18 carbon atoms.

Examples of water immiscible organoamines include octylamine, nonylamine, decylamine, undecylamine, dodecylamine, tridecylamine, tetradecylamine, hexadecylamine, dipentylamine, dihexylamine, diheptylamine, dioctylamine, dinonylamine, didecylamine, propylpentylamine, butylpentylamine, tributylamine, and trihexylamine.

In embodiments, the organoamine also functions as a solvent, with the palladium salt being "dissolved" in the organoamine. The organoamine should thus be in the liquid phase. Due to the different melting points for various organoamines, the temperature of the palladium precursor composition may be greater than room temperature. For example, dodecylamine has a melting point of 28-30° C., hexadecylamine has a melting point of 43-46° C., and octadecylamine has a melting point of 53° C. In some embodiments, the organoamine has a melting point less than 50 degree C., or a melting point of less than 40 degree C., including a melting point less than room temperature. In other words, the organoamine is a liquid at room temperature. Some examples of organoamines that are liquid at room temperature include octylamine (mp=−1° C.), diaminopropane (mp=−12° C.), and tripropylamine (mp=−94° C.). The liquid phase/low melting point is important to achieve a uniform palladium layer. After liquid depositing the precursor composition, an amorphous layer will be formed if an organoamine with a low melting point is used. On the other hand, an organoamine with a high melting point will crystallize out after deposition of the precursor composition, which may cause high surface roughness and holes in the final palladium layer. In embodiments, the temperature of the palladium precursor composition may be from room temperature up to about 80° C. This temperature may occur with no external heat source, for example due to an exothermal reaction between the palladium salt and the organoamine.

In some embodiments, the organoamine is not an amino acid compound. In other words, with reference to Formula (I), none of A, B, or C are substituted with a —COOH group. In some other embodiments, the organoamine can be an amino acid compound (i.e. at least one of A, B, and C is substituted with —COOH).

In more specific embodiments, the organoamine is a primary monoamine, i.e. a compound of the formula $NH_2—R^3$, where $R^3$ is alkyl having from about 2 to about 18 carbon atoms, including from about 5 to about 14 carbon atoms, or from 8 to about 18 carbon atoms.

Without being limited by theory, it is believed that the palladium salt and the organoamine form a palladium amine complex. This is usually evidenced by a color change. For example, palladium acetate is a reddish solution in toluene, but when an organoamine such as octylamine is added, the solution changes into a light yellow color. The palladium amine complex helps to dissolve the palladium salt, permitting high loading of the salt, and as a result, a high palladium content in the precursor composition. In embodiments, the palladium amine complex is dissolved, and the resulting precursor composition is a clear solution. It should be noted that the composition may also comprise non-complexed palladium salt molecules. In specific embodiments, the composition comprises the palladium amine complex and an excess amount of the organoamine in non-complexed form.

In other specific embodiments, the palladium amine complex is formed from a monoamine. In particular, the monoamine may be a primary alkyl monoamine of the formula $NH_2—R^3$, where $R^3$ is alkyl having at least 8 carbon atoms.

The palladium and organoamine in the precursor composition form a complex. It should be noted that palladium is sometimes used as a catalyst in organic synthesis. When an organic synthesis reaction contains an organoamine reagent, a palladium organoamine complex might be formed in an organic reaction. This differs from the present disclosure in several aspects. First, the palladium in a synthesis reaction functions as a catalyst, while the palladium in the present precursor composition provides a metal source for a palladium layer, and does not act as a catalyst. Second, the organoamine in a synthesis reaction functions as a reactant, while the organoamine in the precursor composition functions as a complexing agent and/or solvent. Third, palladium is used in a catalytic amount in those synthesis reactions, while palladium salt is merely one of the dominant components of the precursor composition. In general, here the precursor composition is a non-catalytic composition. Stated differently, the palladium amine complex is not used in forming a product from two reactants. The term "non-catalytic" refers to the fact that the palladium in the palladium precursor composition does not function as a catalyst. This can be seen in that the organoamine does not become part of a third compound in the precursor composition. In other words, the palladium precursor composition does not contain any compounds which become covalently coupled to the organoamine.

In embodiments, the molar ratio of the organoamine to the palladium salt is from about 1:1 to about 10:1. In more specific embodiments, the molar ratio of organoamine to palladium salt is from about 1:1 to about 5:1, or from about 2:1 to about 5:1, or from about 2:1 to about 3:1. In some embodiments, the molar ratio of the organoamine to the palladium salt is at least 2:1 to ensure good dissolution of the palladium salt in the organoamine.

In other specific embodiments, particular combinations of palladium salt and organoamine are contemplated. In these combinations, the total number of carbon atoms in the palladium salt and organoamine are combined, and their total is 10 or higher. For example, if the palladium salt is palladium carboxylate $Pd(OOCR^1)_x(OOCR^2)_{2-x}$, and the organoamine is octylamine $H_2N—R^3$, then the total number of carbon atoms is the carbon atoms in $R^3$+carbon atoms in $R^1$ times X+carbon atoms in $R^2$ time (2−X)+2. As a specific example, if the palladium salt is palladium acetate $Pd(OCOCH_3)_2$ and the organoamine is octylamine, then the total number of carbon atoms is 12, four from the acetate and eight from the organoamine. The total number is based on the chemical formulae for the palladium salt and organoamine. The total number does not change with differences in the relative amounts of the palladium salt and organoamine, and is not related to the number of moles or the weight percentages of the two ingredients. In other embodiments, the total number of carbon atoms in the palladium salt and organoamine is at least 10, or at least 11, or at least 12.

In embodiments, another organic solvent which is immiscible with water can be included, or in other words a second water immiscible organic solvent can be used. When a given organic solvent is mixed with water at about equal amounts by volume, if a phase separation is detected (either visually or by instruments such as light scattering or refractive index) after settling, the solvent is considered to be water immiscible. The palladium salt, the organoamine, and the resulting palladium amine complex should be soluble in this second solvent. For example, at least 0.5 wt % of the amount of the given component added to the second solvent should dissolve, including at least 1 wt %, or at least 10 wt % of the amount added. The non-soluble portion can be removed from the precursor composition by, for example, filtration.

Any suitable water immiscible organic solvent can be used for the second solvent. In some embodiments, the second organic solvent may be a hydrocarbon solvent, for example a substituted hydrocarbon or an aromatic hydrocarbon solvent. Specifically, the hydrocarbon solvent has at least 6 carbon atoms, from 6 to about 25 carbon atoms. Exemplary solvents include toluene, xylene, mesitylene, ethylbenzene, diethylbenzene, trimethyl benzene, methyl ethylbenzene, tetrahydronaphthalene, chlorobenzene, dichlorobenzene, trichlorobenzene, chlorotoluene, and the like, or mixtures thereof. In other embodiments, the second organic solvent is a ketone, ester, ether, and the like. Exemplary solvents include methyl isobutyl ketone, methyl benzoate, benzyl benzoate, anisole, cyclohexanone, acetophenone, and the like. In some embodiments, the second organic solvent has a boiling point at least 80° C., including at least 100° C. In some specific embodiments, the second solvent has a high boiling point at least 150° C.

In particular embodiments, the palladium precursor composition should not contain any water. In other words, the palladium precursor composition fails to include water, or is substantially free of water. However, it should be noted that these phrases do not require an absolute absence of water. Some residual water may be present in the precursor composition from the various ingredients or from ambient/atmospheric conditions. For example, octylamine is typically sold with a specification of maximum 0.1 wt % water content, or tributylamine is typically sold with a specification of maximum 0.3 wt % water content. These amounts of water should be considered to be residual and precursor compositions containing such amounts of water should be considered substantially free of water.

In some other embodiments, water and/or a water miscible solvent may be present in the palladium precursor composition. However, the amount of water and/or water miscible solvent (by weight) is in some embodiments less than the amount of organoamine. Exemplary water miscible solvents include alcohols such as methanol, ethanol, propanol, and butanol; glycols, acetone, tetrahydrofuran (THF), dichloromethane, ethyl acetate, dimethylformamide (DMF), dimethyl sulfoxide (DMSO), acetic acid, acetonitrile, and dioxane. Any suitable concentration of the water and/or water miscible solvent(s) may be present.

The palladium salt typically makes up from about 1 to about 50 weight percent (wt %) of the precursor composition. In more specific embodiments, the palladium salt makes up from about 5 wt % to about 30 wt % of the precursor composition.

The precursor composition can further include another metal species, for example silver (Ag), gold (Au), copper (Cu), nickel (Ni), rhodium (Rh), cobalt (Co), zinc (Zn), platinum (Pt), and the like. The other metal species may be introduced as another starting ingredient, for example in the form of a metal salt. For example, silver acetate can be used in combination with palladium acetate to form a Ag—Pd alloy. The additional metal salt in the composition can be present in an amount of, for example, from about 0.1 wt % to about 40 wt %, including from about 1 wt % to about 20 wt % of the precursor composition. However, the additional metal salt should be less than the amount of the palladium salt.

The palladium precursor composition has a surface tension of less than 33 mN/m, including less than 30 mN/m, or less than 28 mN/m, or for example from about 23 mN/m to about 30 mN/m. This low surface tension enables a uniform coating of palladium to be formed on the substrate. The selection of a suitable organoamine or second water-immiscible organic solvent provides the desired surface tension. The palladium precursor composition has a viscosity from about 0.8 to about 100 cps, including from about 0.8 to about 50 cps, or about 2 to about 30 cps.

In certain embodiments, the palladium precursor composition does not contain a reducing agent, or is substantially free of reducing agent. Some examples of such reducing agents include formic acid and formic acid salts or esters, hypophosphites, hydrazines, ammonium compounds, amine borane compounds, alkali metal borohydrides, oxalic acid, alkali or alkaline earth sulfites, and the like.

The palladium precursor composition can be used to apply a palladium coating or layer onto any substrate or object via solution deposition. The palladium precursor composition can be solution deposited upon the substrate. "Solution depositing" and "solution processing" refer to a process where a liquid is deposited upon the substrate to form a structure. This is in contrast to vacuum depositing processes. The present processes for forming a palladium structure are also different from other solution-based processes, for example electroplating, which requires a plate to remain immersed in a solution and also requires exposure to an electric current to form a metal coating on the plate. The present processes also offer several advantages compared to electroless plating. In electroless plating, the deposition of the palladium is slow, so that the overall plating process takes much longer than the solution deposition processes of the present disclosure. Electroless plating also generates a great deal of waste due to residual metal present in the solution. Electroless plating baths or solutions also often contain a reducing agent. In addition, the present processes allow for fine control of where the palladium is deposited for example by inkjet printing. In other words, it is easy to form a patterned palladium structure in a discrete location using the present processes. In contrast, metal deposition in electroless plating occurs over all surfaces which are immersed in the solution. Masking surfaces which are not to be plated is a complex and time-consuming procedure. However, the present processes can be used in combination with electroplating or electroless plating if needed. For example, the palladium layer formed using the present processes can be used as the base layer for electroplating. Electroless plating palladium or other metals such as copper can be further performed on top of the palladium layer formed with the present processes, for example to increase the thickness of a conductive layer, since palladium is a good seeding layer for electroless plating.

Exemplary solution deposition processes include dip coating, spin coating, spray coating, flexographic printing, offset printing, or inkjet printing (where the palladium precursor composition is ejected onto the substrate by an inkjet printhead). Certain processes involve solution depositing the substrate with the palladium precursor composition to form a structure or film on the substrate. In embodiments, the structure or film has a thickness of from about 10 nanometers to about 50 micrometers, including from about 10 nm to about 30 micrometers, or from about 50 nm to about 5 micrometers, or from about 80 nm to about 1 micrometer.

The palladium precursor composition which was previously deposited is then heated to form the palladium layer on the substrate. The heating causes the palladium amine complex or palladium salt to thermally decompose to form a solid palladium layer. In contrast, in electroless plating, the palladium salt or complex is chemically reduced to palladium. The heating may be performed at a temperature of from about 80° C. to about 350° C. In other embodiments, the heating is performed at a temperature of above 100° C., or from about 120° C. to about 300° C., or from about 150° C. to about 250° C., or a temperature below 200° C., or a temperature below 150° C. Regardless of the substrate used, the heating temperature is desirably one that does not cause adverse changes in the properties of any previously deposited layer(s) or the substrate (whether a single layer substrate or multilayer substrate). The heating may be performed for a period of up to 30 minutes, and could be for a period as short as 0.1 seconds depending on the size of the palladium layer and the heating method. The heating can be performed in air, in an inert atmosphere (for example, under nitrogen or argon), or in a reducing atmosphere (for example, under nitrogen containing from 1 to about 20 percent by volume hydrogen). The heating can also be performed under normal atmospheric pressure or at a reduced pressure of, for example, from about 1000 millibars to about 0.01 millibars. Examples of heating techniques may include thermal heating (for example, a hot plate, an oven, and a burner), infra-red ("IR") radiation, a laser beam, flash light, microwave radiation, or UV radiation, or a combination thereof.

During the heating, in some embodiments, at least a portion of the palladium organoamine complex first form palladium nanoparticles in-situ. These palladium nanoparticles subsequently coalesce into a continuous and uniform palladium layer. This intermediate step where palladium nanoparticles are formed will enhance uniformity of the final palladium film. This is different from a conventional electroless plating process, where the palladium salt deposits into a palladium layer directly without going through an intermediate nanoparticle form. In further embodiments, a majority of the palladium organoamine complex forms palladium nanoparticles in-situ. The formation of palladium nanoparticles is evidenced by the color change of the deposited palladium organoamine complex upon heating. A black color is often observed prior to the formation of the silvery metallic palladium layer, indicating that a palladium nanoparticle intermediate was formed during the heating step.

It should be noted that when the palladium precursor composition is heated to form the palladium layer, the temperature of the precursor composition is increased above the temperature of the precursor composition during the solution deposition. As previously discussed, the temperature of the precursor composition may be greater than room temperature to ensure the organoamine is in the liquid phase during the solution deposition.

The deposition processes described herein can also be repeated to build up a thicker palladium layer on the object. For example, in embodiments, the thickness of the final layer may also be from about 10 nanometers to about 50 micrometers, or from about 50 nanometers to about 30 micrometers, or from about 50 nm to about 5 micrometers, or from about 80 nm to about 1 micrometer. In this regard, multiple solution deposition steps may be performed, with one subsequent heating to form the final layer. Alternatively, the steps of solution deposition and heating can be repeated multiple times to build a thick layer out of several thinner layers.

In particular, it is believed that the surface roughness of the palladium layer produced using the deposition processes and the compositions described herein is less than that produced by other processes (put another way, the palladium layer has high surface smoothness). In embodiments, the resulting palladium layer has a surface roughness of 50 nanometers (nm) or less, including a surface roughness of 20 nm or less, or a surface roughness of 10 nm or less. Alternatively, the ratio between the surface roughness and the thickness of the palladium layer may be in the range of 1/5 or less (i.e. 0.2:1 or less), including a range of 1/10 or less (i.e. 0.1:1 or less) or 1/20 or less (i.e. 0.05:1 or less). The surface roughness is determined by the root mean square (rms) method. Briefly, the surface roughness is measured at several points on the layer. The reported surface roughness is the square root of the arithmetic mean (average) of the squares of the measured values.

Prior to heating, the structure or film containing the palladium salt or palladium amine complex may be electrically insulating or have very low electrical conductivity. Heating results in an electrically conductive layer of palladium. The conductivity of the palladium layer produced by heating is, for example, more than about 100 Siemens/centimeter ("S/cm"), more than about 1000 S/cm, more than about 2,000 S/cm, more than about 5,000 S/cm, or more than about 10,000 S/cm or more than 50,000 S/cm.

In some embodiments, prior to heating, the structure containing the palladium salt or palladium amine complex is amorphous. In some specific embodiments, the palladium organoamine complex remains in the liquid phase prior to heating.

In other embodiments, the palladium layer is not conductive. Although heating causes the decomposition of the palladium complex into palladium, due to the presence of other ions (from the salt) or a residual amount of the organoamine and its decomposed form, or due to the presence of insulative additives in the precursor composition such as polymers, the palladium layer may not necessarily be conductive. However, the palladium layer does have a shiny metallic white color.

In some embodiments, reducing agents may not be needed to prepare and obtain the palladium layer on the object or substrate. Thus, such reducing agents are not present in the palladium precursor composition and are not separately added as an additional processing step.

In particular embodiments, the palladium precursor composition consists essentially of one or more palladium salts and one or more organoamines. The precursor composition has the basic characteristic of being solution-processable. The precursor composition does not contain a reducing agent. In specific embodiments, the organoamine is a primary monoamine.

It is specifically contemplated that the processes used herein can be used for coating a wire (i.e. the substrate is in the form of a wire). It should be noted that any wire can be coated with the palladium precursor composition, regardless of the diameter, shape, or length of the wire. Both organic materials (e.g. plastic) and inorganic materials (e.g. copper) can be used as the substrate for the wire. The wire may be bare (i.e. uncovered with other layers) or may be insulated by the addition of other layers around a core. The wire may be single-stranded (i.e. solid), multiple stranded, and/or twisted. Exemplary inorganic materials include metals such as copper, aluminum, tungsten, zinc oxide, silicon, and the like. Exemplary plastic wires include wires made from polyimide, polyester, polyamide (Nylor), polycarbonate, polyethylene, polyacrylate, and the like.

Optionally, a receiving layer can be applied prior to drawing the object (i.e. wire) through the palladium precursor composition. The receiving layer may enhance the adhesion of the precursor composition on the object. Any suitable receiving layer can be used. Exemplary receiving layers can be formed from, for example, a silane, especially a silane comprising an amino group.

If desired, additional layers can be applied on top of the palladium layer (the additional layers may be referred to as overcoat layers). Any layer known in the art may be applied, particularly materials with good scratch resistance. In embodiments, materials that can be used to form an overcoat layer include an epoxy resin, a polyurethane, a phenol resin, a melamine resin, a polysiloxane, a poly(silsesquioxane), and the like. Polysiloxane and poly(silsesquioxane) precursors (for example sol-gel approach) can be used to from a highly crosslinked polysiloxane or poly(silsesquioxane) overcoat layer. In some specific embodiments, the overcoat layer is a crosslinked polysiloxane, a crosslinked poly(silsesquioxane), or a crosslinked layer comprising poly(vinylphenol) and a melamine-formaldehyde resin. The thickness of the overcoat layer may be for example from about 10 nm to about 10 micrometers, including from about 10 nm to about 5 micrometers, or from about 50 nm to about 1 micrometer. In embodiments, the overcoat layer is transparent to visible light. In other words, the overcoat layer is colorless. This will ensure the visibility of the palladium layer.

FIG. 1 is a schematic diagram illustrating the processes described herein. In step 100, a palladium precursor coating solution 12 is presented in a vessel 14. A wire 20 is drawn through the coating solution to form a coating 22 on the wire. Note that this allows for continuous production of the wire. Next in step 200, the coating 22 is annealed by exposure to heat. The result is a wire 30 having a palladium layer 32. The original wire 20 serves as a substrate upon which the palladium layer is located.

Figure 2:
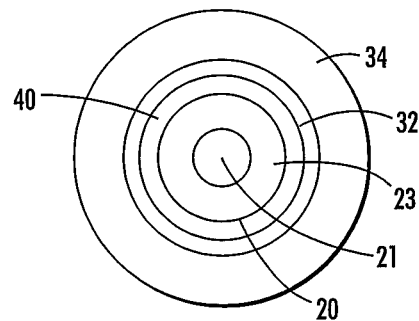
FIG. 2 is a cross-sectional view of a wire having a palladium layer and an overcoat layer atop the palladium layer.

FIG. 2 is a cross-sectional view of the final wire 30. At the center is the original wire 20. As noted above, this original wire 20 may comprise a core 21 and other layers prior to receiving the palladium layer. For example, the original wire may include an optional receiving layer 23. The palladium layer 32 covers the wire 20. An overcoat layer 34 may surround the palladium layer 32.

It may be desirable to clean the wire prior to drawing the wire through the palladium precursor composition. This can be done by, for example, wiping the wire with isopropanol or using a plasma treatment on the surface of the wire. This will aid in maintaining a uniform coating.

In some embodiments, an intermetallic layer 40 is formed between the wire 20 and the palladium layer 32. The intermetallic layer can be formed through diffusion of metal atoms from a metal substrate into an adjacent surface of the palladium layer. For example, the intermetallic layer can be a copper/palladium alloy when copper atoms diffuse from a copper substrate into the palladium layer. The intermetallic layer can be formed at a low annealing temperature, which can be performed at the same temperature as the heating that forms the palladium layer. This annealing temperature can be a temperature of from about 80° C. to about 350° C., or a temperature of above 100° C., or from about 120° C. to about 300° C., or from about 150° C. to about 250° C., or a temperature below 200° C., or a temperature below 150° C. The low annealing temperature to form the intermetallic layer should be no more than 200° C. higher than the temperature used to form the palladium layer. The intermetallic layer can be formed simultaneously (i.e. contemporaneously) with the formation of the palladium layer, or can be formed by a second annealing performed after the palladium layer has been formed.

Figure 9:
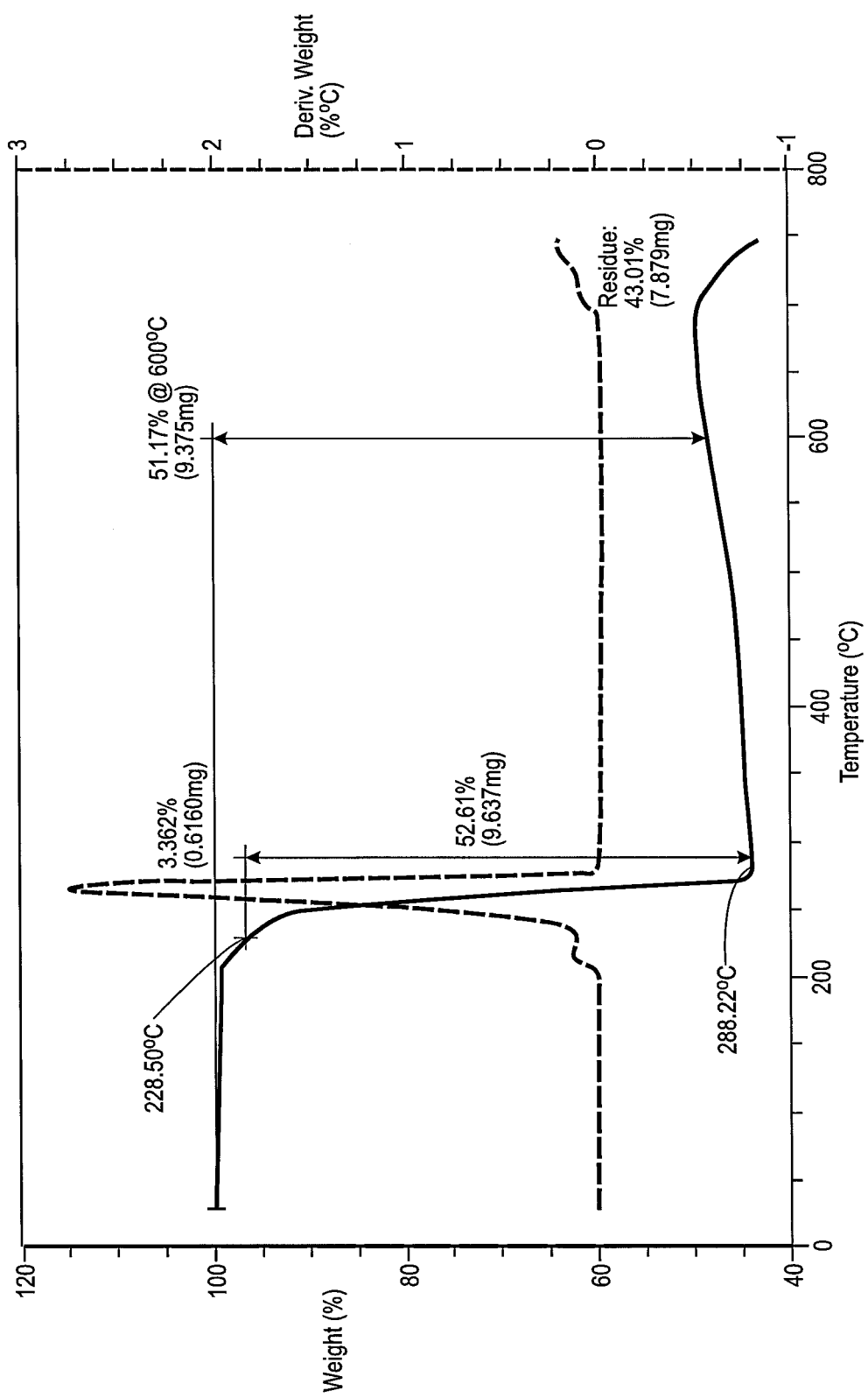
FIG. 9 is a graph showing the thermogravimetric analysis (TGA) curve for palladium acetate.
Figure 10:
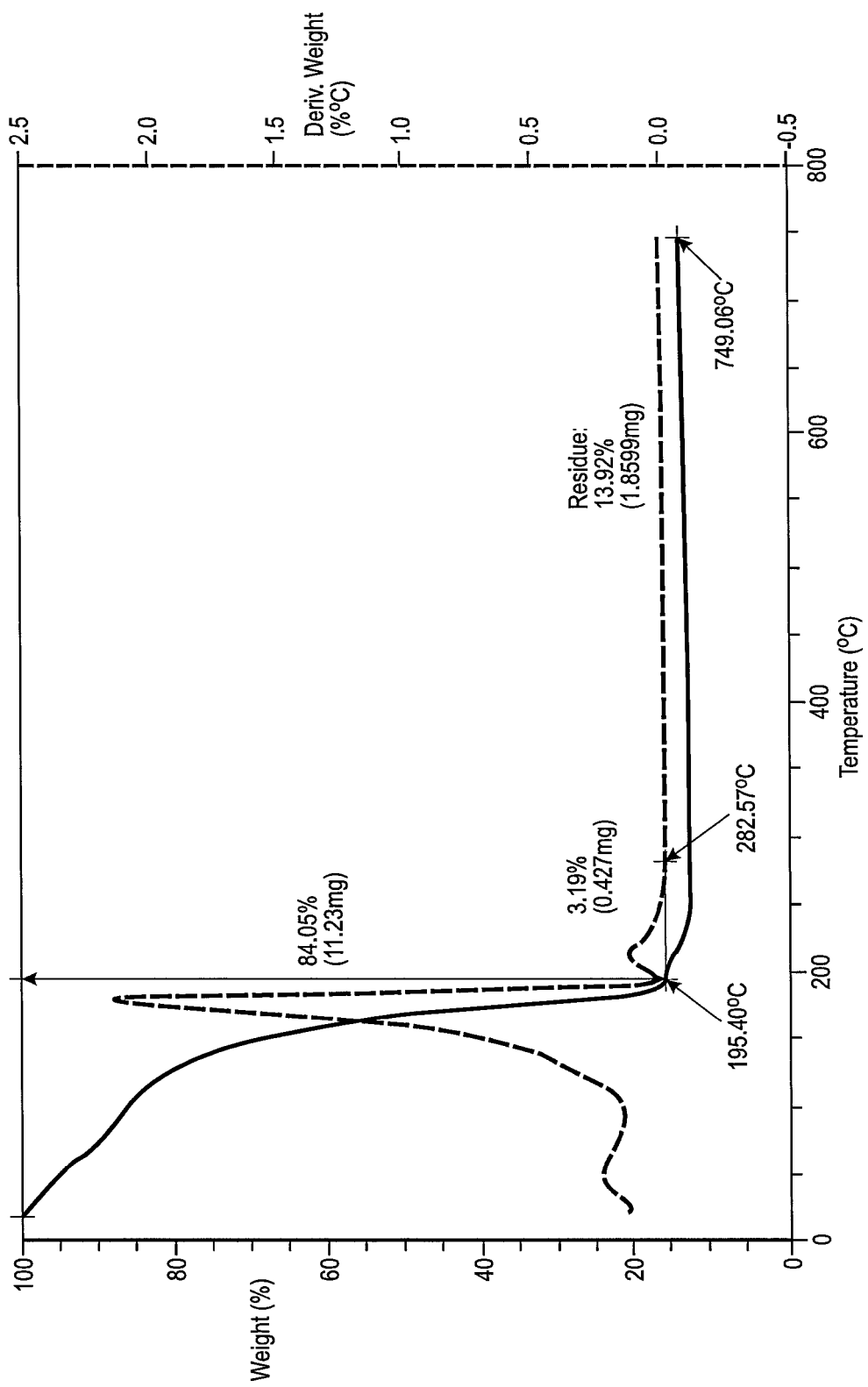
FIG. 10 is a graph showing the TGA curve for a complex of palladium acetate and octylamine.

It has also been surprisingly found that the palladium-organoamine complex formed in the precursor composition has a thermal decomposition temperature which is much lower than the thermal decomposition temperature of the palladium salt used to form the palladium-organoamine complex. This phenomenon is illustrated in FIG. 9 and FIG. 10. FIG. 9 is a graph showing the thermogravimetric analysis (TGA) curve for palladium acetate alone. FIG. 10 is a graph showing the TGA curve for a complex of palladium acetate and octylamine. Looking at FIG. 9, palladium acetate decomposes at a temperature of approximately 288° C. This is shown by the solid line, which drops off significantly and ends at this temperature (solid line corresponds to left-hand axis for weight %). Looking at FIG. 10, the palladium-octylamine complex decomposes at a temperature of approximately 195° C. This gap between decomposition temperatures is about 90° C. In various embodiments, the palladium-organoamine complex has a thermal decomposition temperature which is at least 50° C. lower than the thermal decomposition temperature of the palladium salt used to form the palladium-organoamine complex, including at least 80° C. lower and at least 90° C. lower. This difference in thermal decomposition temperatures is unexpected because a complexing agent is normally used to stabilize a compound. Put another way, the palladium-organoamine complex is expected to have a high decomposition temperature than the palladium acetate salt alone.

The palladium precursor composition may also be useful in forming electrically conductive elements such as electrodes, conductive lines, conductive pads, conductive tracks, circuits, pathways, channels, conductive coatings, conductive films, and the like in electronic devices such as thin film transistors (TFTs), organic light emitting diodes (OLED), radio frequency identification (RFID) tags, photovoltaic, and other electronic devices that include conductive elements or components.

FIGS. 4-7 illustrate some different configurations of thin film transistors. The palladium precursor composition could be used, for example, to form any of the electrodes (gate, source, drain) in the transistor.

Figure 4:
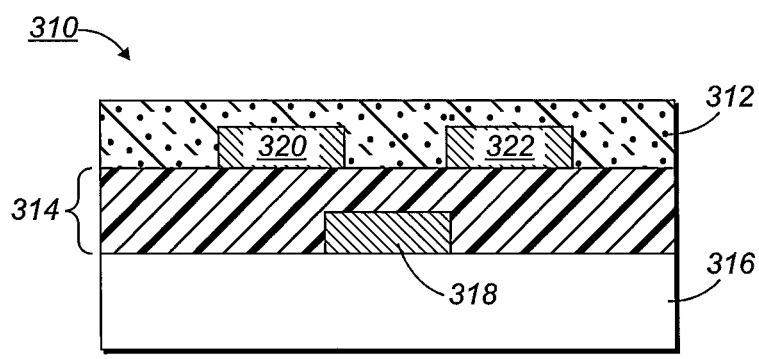
FIG. 4 is a diagram of a first embodiment of a TFT that can have a component formed from a palladium precursor composition.

FIG. 4 illustrates a bottom-gate bottom-contact TFT configuration according to the present disclosure. The TFT 310 comprises a substrate 316 in contact with the gate electrode 318 and a gate dielectric layer 314. The gate electrode 318 is depicted here atop the substrate 316, but the gate electrode could also be located in a depression within the substrate. It is important that the gate dielectric layer 314 separates the gate electrode 318 from the source electrode 320, drain electrode 322, and the semiconducting layer 312. The semiconducting layer 312 runs between the source and drain electrodes 320 and 322. The semiconductor has a channel length between the source and drain electrodes 320 and 322.

Figure 5:
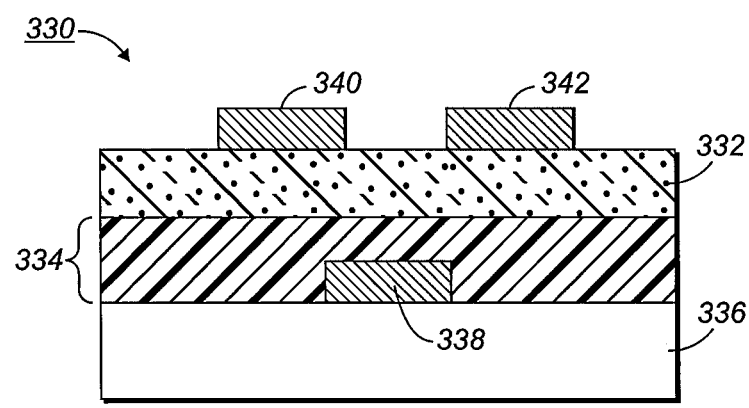
FIG. 5 is a diagram of a second embodiment of a TFT that can have a component formed from a palladium precursor composition.

FIG. 5 illustrates a bottom-gate top-contact TFT configuration according to the present disclosure. The TFT 330 comprises a substrate 336 in contact with the gate electrode 338 and a gate dielectric layer 334. The semiconducting layer 332 is placed on top of the gate dielectric layer 334 and separates it from the source and drain electrodes 340 and 342.

Figure 6:
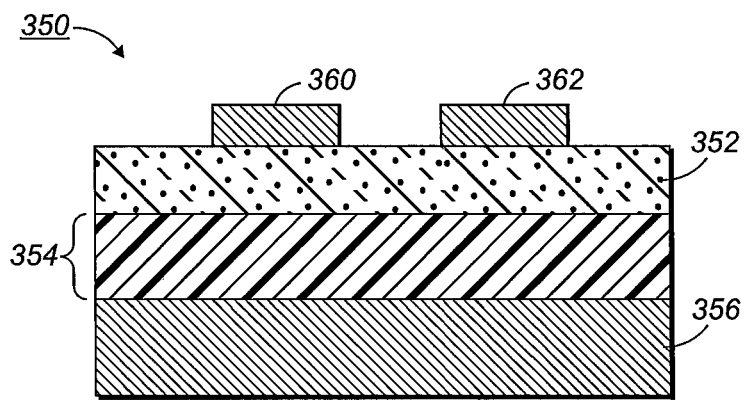
FIG. 6 is a diagram of a third embodiment of a TFT that can have a component formed from a palladium precursor composition.

FIG. 6 illustrates a bottom-gate bottom-contact TFT configuration according to the present disclosure. The TFT 350 comprises a substrate 356 which also acts as the gate electrode and is in contact with a gate dielectric layer 354. The source electrode 360, drain electrode 362, and semiconducting layer 352 are located atop the gate dielectric layer 354.

Figure 7:
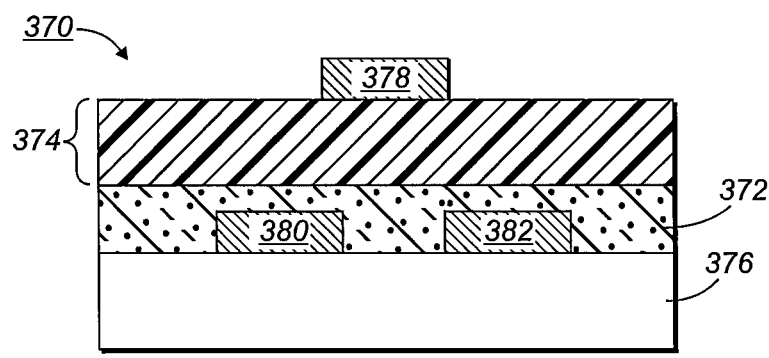
FIG. 7 is a diagram of a fourth embodiment of a TFT that can have a component formed from a palladium precursor composition.

FIG. 7 illustrates a top-gate top-contact TFT configuration according to the present disclosure. The TFT 370 comprises a substrate 376 in contact with the source electrode 380, drain electrode 382, and the semiconducting layer 372. The semiconducting layer 372 between the source and drain electrodes 380 and 382. The gate dielectric layer 374 is on top of the semiconducting layer 372. The gate electrode 378 is on top of the gate dielectric layer 374 and does not contact the semiconducting layer 372.

A thin film transistor generally includes a substrate, a dielectric layer, and a semiconducting layer in addition to the source electrode, drain electrode, and optional gate electrode.

The substrate may be composed of materials including but not limited to silicon, glass plate, plastic film or sheet, and various metals. For structurally flexible devices, plastic substrate, such as for example polyester, polycarbonate, polyimide sheets and the like may be preferred. The thickness of the substrate may be from about 10 micrometers to over 10 millimeters with an exemplary thickness being from about 50 to about 100 micrometers, especially for a flexible plastic substrate and from about 0.5 to about 10 millimeters for a rigid substrate such as glass or silicon.

The dielectric layer generally can be an inorganic material film, an organic polymer film, or an organic-inorganic composite film. Examples of inorganic materials suitable as the dielectric layer include silicon oxide, silicon nitride, aluminum oxide, barium titanate, barium zirconium titanate and the like. Examples of suitable organic polymers include polyesters, polycarbonates, poly(vinyl phenol), polyimides, polystyrene, polymethacrylates, polyacrylates, epoxy resin and the like. The thickness of the dielectric layer depends on the dielectric constant of the material used and can be, for example, from about 10 nanometers to about 500 nanometers. The dielectric layer may have a conductivity that is, for example, less than about $10^{-12}$ Siemens per centimeter (S/cm). The dielectric layer is formed using conventional processes known in the art, including those processes described in forming the gate electrode.

The dielectric layer may be surface modified with a surface modifier. Exemplary surface modifiers include organosilanes such as hexamethyldisilazane (HMDS), octyltrichlorosilane (OTS-8), octadecyltrichlorosilane (ODTS-18), and phenyltrichlorosilane (PTS). The semiconducting layer can be directly contacted with this modified dielectric layer surface. The contact may be complete or partial. This surface modification can also be considered as forming an interfacial layer between the dielectric layer and the semiconducting layer.

The semiconducting layer generally is made from an organic semiconducting material. Examples of organic semiconductors include but are not limited to acenes, such as anthracene, tetracene, pentacene, and substituted pentacenes, perylenes, fullerenes, oligothiophenes, polythiophenes and their substituted derivatives, polypyrrole, poly-p-phenylenes, poly-p-phenylvinylidenes, naphthalenedicarboxylic dianhydrides, naphthalene-bisimides, polynaphthalenes, phthalocyanines such as copper phthalocyanines or zinc phthalocyanines and their substituted derivatives. The semiconductor may also be an inorganic semiconductor such as ZnO, ZnS, silicon nanowires, and the like.

In specific embodiments, the semiconductors are polythiophenes. Polythiophenes include, for example, regioregular and regiorandom poly(3-alkylthiophene)s, polythiophenes comprising substituted and unsubstituted thienylene groups, polythiophenes comprising optionally substituted thieno[3,2-b]thiophene and/or optionally substituted thieno[2,3-b]thiophene groups, polythiophenes comprising fused-ring aromatic groups, polythiophenes comprising heteroatom-containing fused-ring aromatic groups, and polythiophenes comprising non-thiophene based aromatic groups such as phenylene, fluorene, furan, and the like.

The semiconducting layer is from about 5 nanometers to about 1000 nanometers deep, including from about 20 to about 100 nanometers in depth. In certain configurations, such as the configurations shown in FIG. 3 and FIG. 6, the semiconducting layer completely covers the source and drain electrodes. The semiconducting layer has a channel length defined by the distance between the source and drain electrodes.

The semiconducting layer can be formed by molecular beam deposition, vacuum evaporation, sublimation, spin-on coating, dip coating, printing (e.g., inkjet printing, screen printing, stencil printing, microcontact printing, flexographic printing), and other conventional processes known in the art, including those processes described in forming the gate electrode.

Regarding electrical performance characteristics, the organic semiconductor usually has a conductivity in the range of $10^{-8}$ to $10^{-4}$ S/cm. Various dopants known in the art may also be added to change the conductivity. The organic semiconductor can be either a p-type or n-type semiconductor. For p-type, the semiconductor usually has an energy level (HOMO level) of higher than 4.5 eV. In specific embodiments, the p-type semiconductor has a HOMO level of about 5.1 eV. For n-type, the semiconductor usually has a energy level (LUMO level) of lower than 4.5 eV. In specific embodiments, the n-type semiconductor has a LUMO level of about 4.0 eV. In specific embodiments, the semiconductor is a p-type semiconductor. In specific embodiments, the organic semiconductor is a polythiophene. Polythiophenes generally have a HOMO level of from about 4.7 eV to about 5.5 eV.

The source, drain, and optional gate electrodes may be made from other electrically conductive materials as well. They can be for example, a thin metal film, a conducting polymer film, a conducting film made from conducting ink or paste, or in the case of the gate electrode the substrate itself, for example heavily doped silicon. Other examples of electrode materials include but are not restricted to aluminum, gold, silver, chromium, zinc, indium, conductive metal oxides such as zinc-gallium oxide, indium tin oxide, indium-antimony oxide, conductive polymers such as polystyrene sulfonate-doped poly(3,4-ethylenedioxythiophene) (PSS-PEDOT), and conducting ink/paste comprised of carbon black/graphite. The electrodes can be prepared by vacuum evaporation, sputtering of metals or conductive metal oxides, conventional lithography and etching, chemical vapor deposition, spin coating, casting or printing, or other deposition processes. The thickness of the gate electrode ranges for example from about 10 to about 200 nanometers for metal films and from about 1 to about 10 micrometers for conductive polymers. Typical thicknesses of source and drain electrodes are, for example, from about 40 nanometers to about 1 micrometer, including more specific thicknesses of from about 100 to about 400 nanometers.

If desired, a barrier layer may also be deposited on top of the TFT to protect it from environmental conditions, such as light, oxygen and moisture, etc. which can degrade its electrical properties. Such barrier layers are known in the art and may simply consist of polymers.

The various components of the TFT may be deposited upon the substrate in any order. Generally, however, the gate electrode and the semiconducting layer should both be in contact with the gate dielectric layer. In addition, the source and drain electrodes should both be in contact with the semiconducting layer. The phrase "in any order" includes sequential and simultaneous formation. For example, the source electrode and the drain electrode can be formed simultaneously or sequentially. The term "on" or "upon" the substrate refers to the various layers and components with reference to the substrate as being the bottom or support for the layers and components which are on top of it. In other words, all of the components are on the substrate, even though they do not all directly contact the substrate. For example, both the dielectric layer and the semiconducting layer are on the substrate, even though one layer is closer to the substrate than the other layer.

Figure 8:
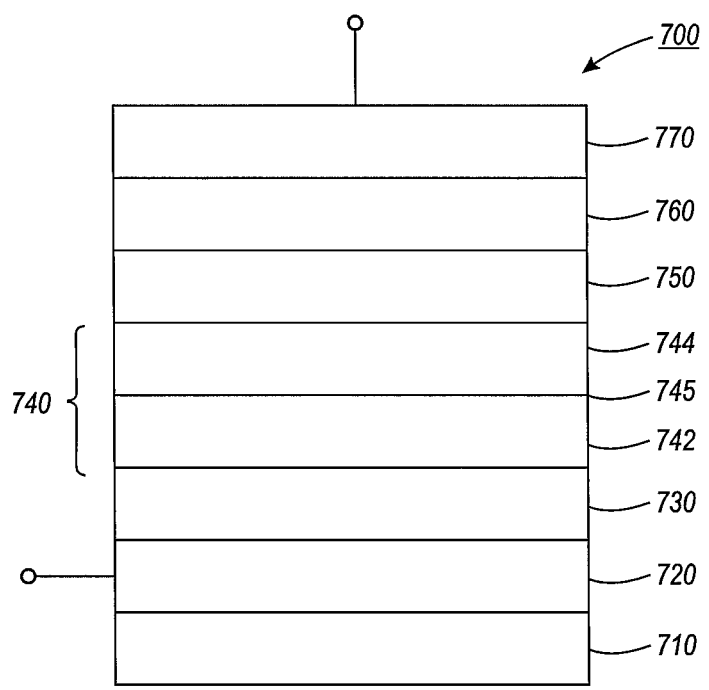
FIG. 8 is a cross-sectional view of an exemplary photovoltaic device that can have a component formed from a palladium precursor composition.

FIG. 8 is a side cross-sectional view of an exemplary photovoltaic device 700. A substrate 710 is provided. A first electrode, such as anode 720, is located upon the substrate 710. A semiconducting layer 740 is then located upon the anode 720. In some embodiments, such as the one depicted here, the semiconducting layer 740 may be made from layers of different materials, shown here as a first sublayer 742 and a second sublayer 744. The first sublayer 742 is located closer in distance to the anode 720 than the second sublayer 744. A junction 745 is formed between the first sublayer 742 and the second sublayer 744. An optional electron blocking layer 730 may be located between the anode 720 and the first sublayer 742, if desired. An electron transporting layer 750 contacts the second sublayer 744 of the semiconducting layer 740. An optional hole blocking layer 760 is located on the electron transporting layer 750. Finally, a second electrode, such as cathode 770, is placed upon the substrate 710 and on the hole blocking layer 760. The second sublayer 744 of the semiconducting layer 740 is closer to the cathode 770 than the first sublayer 742. It should also be noted that the anode 720 is located closer to the substrate 710 than cathode 770.

Only the substrate 710, anode 720, semiconducting layer 740, electron transporting layer 750, and cathode 770 are required to produce a functioning photovoltaic device. However, the additional layers are also helpful in obtaining a highly efficient photovoltaic device. When described in other terms, the semiconducting layer 740 is located between the anode 720 and the cathode 770. Also, the electron transporting layer 750 is located between the second sublayer 744 and the cathode 770. The hole blocking layer 760 is located between the second sublayer 744 and the cathode 770 as well. When both an electron transporting layer and hole blocking layer are present, the hole blocking layer 760 is located between the electron transporting layer 750 and the cathode 770.

The substrate 710 of the photovoltaic device supports the other components of the photovoltaic device. The substrate should also be optically transparent in at least the NIR range of the spectrum, to allow light to pass through and contact the semiconducting layer. Generally, the substrate is composed of materials as previously described for the substrate of a thin film transistor.

The anode 720 or cathode 770 may be made from the palladium precursor composition, or using materials as previously described for the electrodes of a thin film transistor. The semiconducting layer 740 can be made using materials as previously described for the electrodes of a thin film transistor.

The electron transporting layer 750 is located between the semiconducting layer 740 and the cathode 770. This layer is generally made from a material which allows electrons to move efficiently, and may also absorb some light wavelengths. Exemplary materials for the electron transporting layer include $C_{60}$ fullerene, [6,6]-phenyl-$C_{61}$-butyric acid methyl ester (PCBM), $C_{70}$ fullerene, [6,6]-phenyl-$C_{71}$-butyric acid methyl ester (PC[70]BM), or any fullerene derivative. The electron transporting layer may have a thickness of from about 5 nanometers to about 100 nanometers.

An electron blocking layer 730 may be present between the anode 720 and the semiconducting bilayer 740. This layer prevents recombination at the anode by inhibiting the movement of electrons to the anode. Exemplary materials include poly(3,4-ethylenedioxythiophene):poly(styrene sulfonic acid) (PEDOT:PSS), $MoO_3$, and $V_2O_5$. The electron blocking layer may have a thickness of from about 1 nanometers to about 100 nanometers.

A hole blocking layer 760 may also be located between the electron transporting layer 750 and the cathode 770. Exemplary hole blocking materials for this layer include bathocuproine (BCP), lithium fluoride, and bathophenanthroline. The hole blocking layer may have a thickness of from about 0.1 nanometers to about 100 nanometers.

The following examples are for purposes of further illustrating the present disclosure. The examples are merely illustrative and are not intended to limit devices made in accordance with the disclosure to the materials, conditions, or process parameters set forth therein.

EXAMPLES

Comparative Example 1

Palladium acetate (trimer) was purchased from Alfa Aesar. 0.1 grams of palladium acetate was added into 0.7 grams toluene. The salt was partially soluble and displayed an orange-brown color.

Example 1

Palladium acetate (trimer) was purchased from Alfa Aesar. 0.1 grams of palladium acetate was added into 0.7 grams toluene. 0.22 grams of octylamine was then added into the mixture, and the mixture was then shaken. The insoluble part of the palladium salt was dissolved to form a very stable light yellow solution.

Test Results

The solutions of the Comparative Example 1 and Example 1 were each spin-coated onto a glass slide to form a film. The solution of Example 1 formed a uniform film without crystallization or precipitation. In contrast, the solution of the Comparative Example formed a non-uniform film with precipitates of the salt after spin coating.

After being heated at 200-250° C. for a few minutes, the film of Example 1 changed into first a black color, then a shiny metallic color. The palladium thin film was measured to be very conductive by two probe measurement having a conductivity estimated to be around $1.0 \times 10^4$ S/cm.

Example 2

Figure 3:
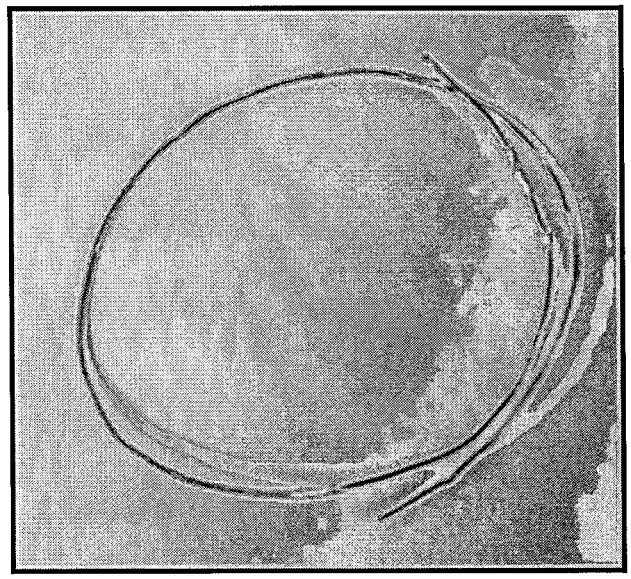
FIG. 3 is a picture of a copper wire with a palladium coating.

A copper wire was dipped into the solution of Example 1 to coat the surface of the wire with the palladium precursor composition. After being slowly pulled out of the solution, the wire was heated at 200° C. in an oven for 5 minutes under reducing gas (4.5% hydrogen in nitrogen). A shiny metallic white wire was obtained, and is seen in FIG. 3. The palladium coating was very robust when washed with solvents such as isopropyl alcohol (IPA) and toluene, i.e. the coating did not dissolve or flake. The palladium coating also resisted damage under mechanical rubbing.

Example 3

Palladium acetate (trimer) was purchased from Alfa Aesar. 0.1 grams of palladium acetate was added into 0.7 grams benzyl benzoate. 0.22 grams of octylamine was then added into the mixture, and the mixture was then shaken. The insoluble part of the palladium salt was dissolved to form a very stable light yellow solution.

Example 4

2.5 grams of palladium acetate was added into 1.5 grams toluene. 6.0 grams of octylamine was then added into the mixture slowly, and the mixture was then shaken. The temperature of the mixture increased to about 60-65 degree C. due to the exothermal reaction between palladium acetate and octylamine to form palladium organoamine complex. After stirring for 24 hours at room temperature, the palladium acetate was completely dissolved to form a very stable light yellow solution. The viscosity of the solution was measured to be about 30 cps.

Example 5

0.1 grams of palladium acetate was added into 0.25 grams octylamine. The liquid octylamine functioned as both a complexing agent and a solvent. After being stirred at room temperature, a clear yellow color oil-like paste was obtained. The paste was painted on a glass slide and annealed at 250 degree C. in an oven. The clear paste turned into a dark paste first, then into a silvery metallic palladium layer.

Example 6

Palladium acetate (trimer) was purchased from Alfa Aesar. 6.0 grams of octylamine was mixed with 1.5 grams of toluene.

2.5 grams of palladium acetate was added slowly into the octylamine and toluene mixture at room temperature, followed by stirring and heating the reaction mixture from room temperature to 40° C. for 10 hours. No reducing agent was present. All of the palladium acetate was dissolved, resulting in a very stable light yellow homogeneous solution. This palladium composition has a palladium content of 12.75% by weight as determined by TGA method. The palladium composition was then spin coated onto a glass slide. After drying off the toluene solvent, a clear amorphous film was obtained. Upon annealing on a hotplate in air at 230° C., the amorphous palladium complex film decomposed into a black palladium nanoparticle film first, then a metallic palladium layer.

Example 7

Palladium acetate (trimer) was purchased from Alfa Aesar. 7.3 grams of decylamine was mixed with 1.5 grams of toluene. 2.5 grams of palladium acetate was added slowly into the decylamine and toluene mixture at room temperature, followed by stirring and heating the reaction mixture from room temperature to 40° C. for 10 hours. No reducing agent was present. The amine to palladium acetate ratio was the same as Example 1. All of the palladium acetate was dissolved, resulting in a very stable light yellow homogeneous solution. This palladium composition has a palladium content of 10.5% by weight as determined by TGA method. The palladium composition was then spin coated onto a glass slide. After drying off the toluene solvent, a clear amorphous film was obtained. Upon annealing on a hotplate in air at 230° C., the amorphous palladium complex film decomposed into a black palladium nanoparticle film first, then a metallic palladium layer.

Example 8

Palladium acetate (trimer) was purchased from Alfa Aesar. 8.56 grams of dodecylamine was mixed with 1.5 grams of toluene. 2.5 grams of palladium acetate was added slowly into the dodecylamine and toluene mixture at 40° C., followed by stirring and heating the reaction mixture at 40° C. for 10 hours. No reducing agent was present. The amine to palladium acetate ratio was the same as Example 1. All of the palladium acetate was dissolved, resulting in a very stable, light yellow, homogeneous solution. This palladium composition has a palladium content of 9.5% by weight as determined by TGA method. The palladium composition was then spin coated onto a glass slide. After drying off the toluene solvent, a thin film with some small crystal domains was obtained. Upon annealing on a hotplate in air at 230° C., the film decomposed into a black palladium nanoparticle film first, then a metallic palladium layer with some textures (i.e. not uniform).

Comparative Example S1

Palladium acetate (trimer) was purchased from Alfa Aesar. 4.8 grams of cyclohexylamine was mixed with 1.5 grams of toluene. 2.5 grams of palladium acetate was added slowly into the cyclohexylamine and toluene mixture, and the mixture was then heated from room temperature to 40° C. No reducing agent was present. Upon adding the palladium acetate, a white precipitate was formed immediately, resulting in a heterogeneous mixture. A uniform film was not able to be achieved with this heterogeneous mixture.

Comparative Example S2

Palladium acetate (trimer) was purchased from Alfa Aesar. 3.5 grams of butylamine was mixed with 1.5 grams of toluene. 2.5 grams of palladium acetate was added slowly into the butylamine and toluene mixture and the mixture was then heated from room temperature to 40° C. No reducing agent was present. Upon adding the palladium acetate, a white precipitate was formed immediately, resulting in a heterogeneous mixture. A uniform film was not able to be achieved with this heterogeneous mixture.

Comparative Example S3

Palladium acetate (trimer) was purchased from Alfa Aesar. 6.0 grams of 1,6-hexyldiamine was mixed with 1.5 grams of toluene. 2.0 grams of palladium acetate was added slowly into the 1,6-hexyldiamine and toluene mixture and the mixture was then heated from room temperature to 40° C. No reducing agent was present. Upon adding the palladium acetate, a white precipitate was formed immediately, resulting in a heterogeneous mixture. A uniform film was not able to be achieved with this heterogeneous mixture.

Comparative Example S4

Palladium chloride was purchased from Alfa Aesar. 6.0 grams of octylamine was mixed with 1.5 grams of toluene. 2.5 grams of palladium chloride was added slowly into the octylamine and toluene mixture at room temperature, followed by stirring and heating the reaction mixture from room temperature to 40° C. for 10 hours. No reducing agent was present. The majority of the palladium chloride was not dissolved, and no homogeneous solution was obtained.

Comparative Example S5

Palladium acetate (trimer) was purchased from Alfa Aesar. 6.0 grams of dioctylamine was mixed with 1.5 grams of toluene. 1.3 grams of palladium acetate was added slowly into the dioctylamine and toluene mixture at room temperature, followed by stirring and heating the reaction mixture from room temperature to 40° C. for 10 hours. No reducing agent was present. All of the palladium acetate was dissolved, resulting in a very stable light yellow homogeneous solution. This palladium composition had a palladium content of 6.5% by weight, which is significantly lower than the Example. An attempt to add more palladium acetate into the composition was not successful, as the solution reached complexing saturation. The palladium composition was spin coated on a glass slide. After drying off the toluene solvent, a clear amorphous film was obtained. Upon annealing on a hotplate in air at 250° C., the amorphous palladium complex film decomposed into a very thin black film. Further annealing did not yield a metallic palladium layer.

Comparative Example S6

Bis(acetylacetonato) palladium salt was purchased from Sigma Aldrich. 6.0 grams of octylamine was mixed with 1.5 grams of toluene. 2.0 grams of bis(acetylacetonato) palladium was added slowly into the octylamine and toluene mixture at room temperature, followed by stirring and heating the reaction mixture from room temperature to 40° C. for 10 hours. No reducing agent was present. The majority of the palladium salt was not dissolved, and no homogeneous solution was obtained.

Results

The following Table 1 summarizes Examples 6-8 and Comparative Examples S1-S6, as well as some other experiments that were conducted in a similar manner.

TABLE 1

| Palladium Salt | Organoamine | Solvent | Soluble Palladium complex obtained? | Palladium contents (wt %) | Uniform palladium coating? |
|---|---|---|---|---|---|
| Palladium Acetate | Octylamine | toluene | Yes | 12.75 | Yes |
| Palladium Acetate | Octylamine | 1,2,4-trimethyl benzene | Yes | 12.5 | Yes |
| Palladium Acetate | Decylamine | Toluene | Yes | 10.5 | Yes |
| Palladium Acetate | Dodecylamine | Toluene | Yes | 9.5 | No |
| Palladium Acetate | Dioctylamine | toluene | Yes | 6.5 | No |
| Palladium Acetate | Octylamine | decalin | No | NA | NA |
| Palladium Acetate | Cyclohexylamine | toluene | No | NA | NA |
| Palladium Acetate | Butylamine | toluene | No | NA | NA |
| Palladium Acetate | 1,6-hexyldiamine | toluene | No | NA | NA |
| Palladium Acetate | Ethanol amine | toluene | No | NA | NA |
| Palladium chloride | Octylamine | toluene | No | NA | NA |
| Bis(acetyl acetonato) palladium | Octylamine | toluene | No | NA | NA |

The combination of palladium acetate and either octylamine or decylamine was unique. This combination resulted in a clear and stable solution with a relatively high palladium content. Upon coating as a thin film, this combination formed an amorphous palladium complex layer, which is critical to achieving a very uniform conductive coating upon annealing. The other combinations resulted in either a heterogeneous slurry or a solution that could not form a uniform coating. It was surprising that only the combination of palladium acetate with octylamine or decylamine produced a soluble complex that could produce a uniform coating.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An object comprising a substrate and a layer of a palladium precursor composition upon the substrate; wherein the palladium precursor composition comprises a palladium salt and an organoamine which together form an amorphous complex, wherein the composition is substantially free of reducing agent and water;
wherein the organoamine is a water immiscible monoamine selected from the group consisting of octylamine, nonylamine, decylamine, undecylamine, dodecylamine, tridecylamine, tetradecylamine, hexadecylamine, dipentylamine, dihexylamine, diheptylamine, dioctylamine, dinonylamine, didecylamine, propylpentylamine, butylpentylamine, tributylamine, and trihexylamine; and
wherein the total number of carbon atoms in the palladium salt and the organoamine combined is at least 12.

2. The object of claim 1, wherein the object is a wire.

3. The object of claim 1, wherein the substrate is copper.

4. The object of claim 1, further comprising an intermetallic layer between the substrate and the layer of the palladium precursor composition.

5. The object of claim 4, wherein the substrate is copper, and wherein the intermetallic layer is an alloy of palladium and copper.

6. The object of claim 1, wherein the palladium salt is selected from the group consisting of palladium carboxylate, palladium chloride, palladium nitrate, palladium sulfate, palladium iodide, palladium cyanide, ethylenediamine palladium chloride, tetraaminepalladium bromide, bis(acetylacetonato) palladium, diamine dinitro palladium, and mixtures thereof.

7. The object of claim 1, wherein the palladium salt is a palladium carboxylate having a structure of $Pd(OOCR^1)_x(OOCR^2)_{2-x}$, wherein $R^1$ and $R^2$ are independently selected from hydrogen, alkyl having 1 to 11 carbon atoms, alkenyl having 2 to about 13 carbon atoms, and alkynyl having 2 to about 13 carbon atoms; and x is any real number from 0 to 2.

8. The object of claim 1, wherein the organoamine has a melting point below 50° C.

9. The object of claim 1, wherein the palladium salt is from about 1 to about 50 weight percent of the precursor composition.

10. The object of claim 1, wherein the molar ratio of the organoamine to the palladium salt in the precursor composition is from about 1:1 to about 10:1.

11. The object of claim 1, wherein the palladium precursor composition has a surface tension less than 33 mN/m at 25° C.

12. The object of claim 1, wherein the palladium precursor composition further comprises another metal species selected from silver (Ag), gold (Au), copper (Cu), nickel (Ni), rhodium (Rh), cobalt (Co), zinc (Zn), and platinum (Pt).

* * * * *